US010565670B2

United States Patent
Chen et al.

(10) Patent No.: US 10,565,670 B2
(45) Date of Patent: Feb. 18, 2020

(54) GRAPHICS PROCESSOR REGISTER RENAMING MECHANISM

(71) Applicant: Intel Corporation, Santa Clara, CA (US)

(72) Inventors: Kaiyu Chen, Santa Clara, CA (US); Guei-Yuan Lueh, San Jose, CA (US); Subramaniam Maiyuran, Gold River, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/281,276

(22) Filed: Sep. 30, 2016

(65) Prior Publication Data

US 2018/0096446 A1   Apr. 5, 2018

(51) Int. Cl.
| | | |
|---|---|---|
| G09G 5/36 | (2006.01) | |
| G06T 1/20 | (2006.01) | |
| G06T 1/60 | (2006.01) | |
| G06T 15/00 | (2011.01) | |
| G06T 15/80 | (2011.01) | |

(52) U.S. Cl.
CPC ............ *G06T 1/20* (2013.01); *G06T 1/60* (2013.01); *G06T 15/005* (2013.01); *G06T 15/80* (2013.01)

(58) Field of Classification Search
CPC ...... G06F 9/384; G06F 9/3836; G06F 9/3863; G06F 9/3012; G06F 9/30138; G06F 9/3838; G06F 9/30127; G06T 15/005
See application file for complete search history.

(56) References Cited

U.S. PATENT DOCUMENTS

| 7,640,421 | B1 | 12/2009 | Garlick | |
|---|---|---|---|---|
| 2001/0004755 | A1* | 6/2001 | Levy | ............ G06F 9/30076 |
| | | | | 712/217 |
| 2008/0136829 | A1 | 6/2008 | Su | |
| 2008/0177987 | A1 | 7/2008 | McIlvaine et al. | |
| 2011/0161616 | A1 | 6/2011 | Tarjan et al. | |
| 2014/0040595 | A1 | 2/2014 | Tran | |
| 2016/0026463 | A1 | 1/2016 | Sundar | |

OTHER PUBLICATIONS

Jeon et al. , "GPU Register File Virtualization", Published in MICRO-48 Dec. 5-9, 2015, obtained from ACM Digital Library.*
PCT International Search Report and Written Opinion of the International Searching Authority for International Application No. PCT/US2017/043718, dated Oct. 26, 2017, 14 pages.
Jeon, H., Ravi, et al. (2015). GPU register file virtualization. In the Proceedings of the Annual International Symposium on Microarchitecture, (vol. Dec. 5-9, 2015, pp. 420-432).

* cited by examiner

*Primary Examiner* — Hau H Nguyen
(74) *Attorney, Agent, or Firm* — Jaffery Watson Mendonsa & Hamilton LLP

(57) ABSTRACT

A processing apparatus is described. The apparatus includes a graphics processing unit (GPU), including a plurality of execution units to process graphics context data and a register file having a plurality of registers to store the graphics context data; and register renaming logic to facilitate dynamic renaming of the plurality of registers by logically partitioning the plurality of registers in the register file into a set of fixed registers and a set of shared registers.

23 Claims, 18 Drawing Sheets

GRAPHICS PROCESSOR REGISTER RENAMING MECHANISM

FIELD

Embodiments described herein generally relate to computers. More particularly, embodiments are described for implementing physical registers in a graphics processor.

BACKGROUND

Graphics processing involves a performance of rapid mathematical calculations for image rendering. Such graphics workloads may be performed at a graphics processing unit (GPU), which is a specialized electronic circuit, to rapidly manipulate and alter memory to accelerate the creation of images in a frame buffer intended for output to a display. The size of the register file (or amount of physical registers) available on current GPU designs has a large impact on both GPU performance and power consumption.

To sustain increasing throughput demand of contemporary graphics workloads, GPUs rely on highly parallel execution of multiple hardware contexts. In such parallel execution each context has a dedicated register file in order to enable fast context switching. Thus, if the number of registers allocated to a hardware context is too small, a large workload will have spills to main memory, resulting in an undesired performance penalty. Nonetheless, it is not feasible to provide too many on-chip registers due to associated hardware cost and power consumption constraints.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
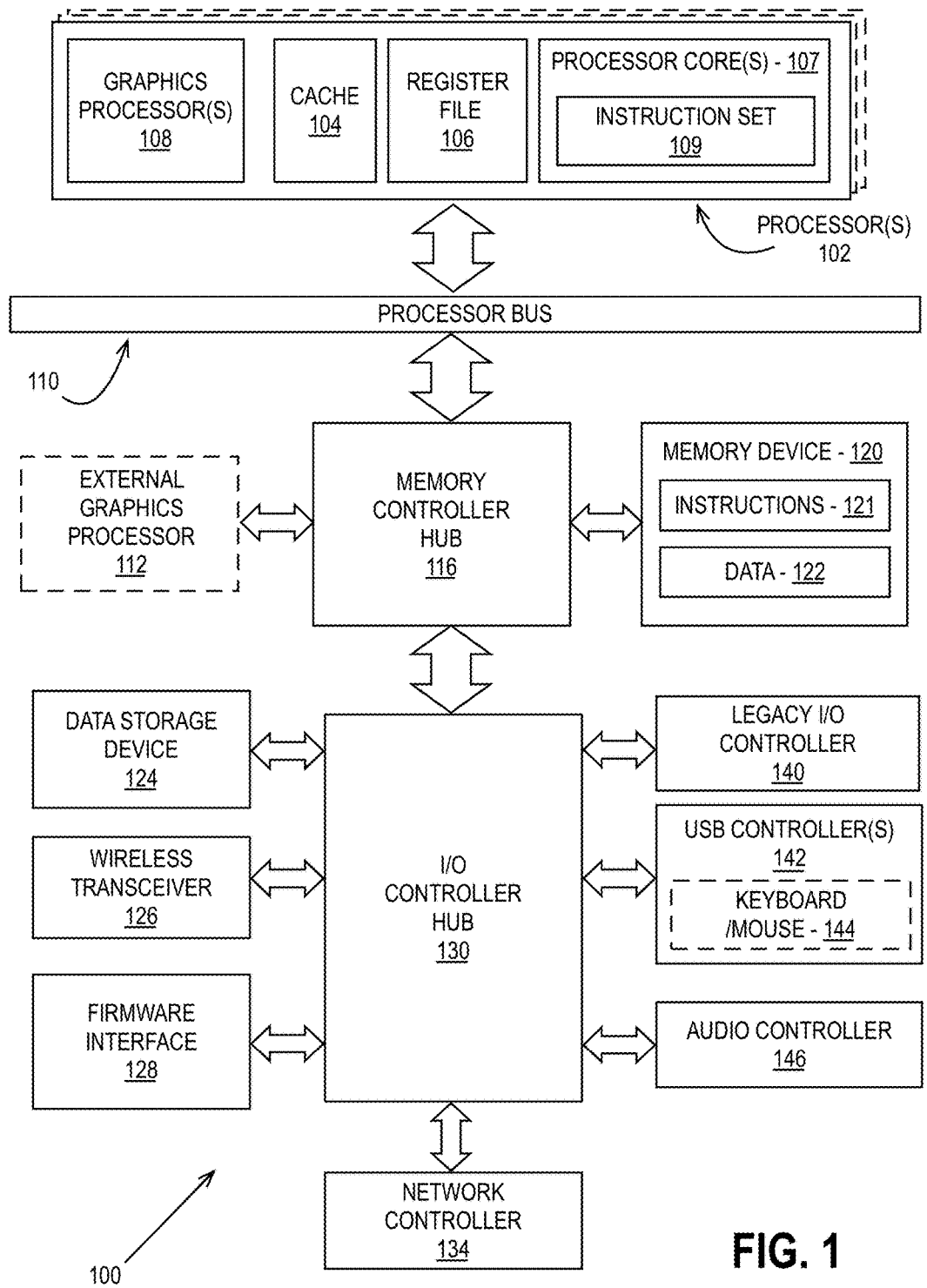
FIG. 1 is a block diagram of a processing system, according to an embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for register renaming logic that enables dynamic register renaming at a graphics processing unit. In such embodiments, a register space is partitioned into a fixed portion and a shared portion to increase register file utilization in order to sustain a level of parallelism and increase register file utilization. In further embodiments, a variable assigned to the shared portion of the register space during kernel execution is dynamically renamed to a unified physical register file that is shared among all hardware contexts on the same execution unit (EU). In yet a further embodiment, compiler assistance and instruction set architecture (ISA) support enables a dynamically allocated register to be released at the end of its live range and reused by another context.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an API, such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a 3D game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
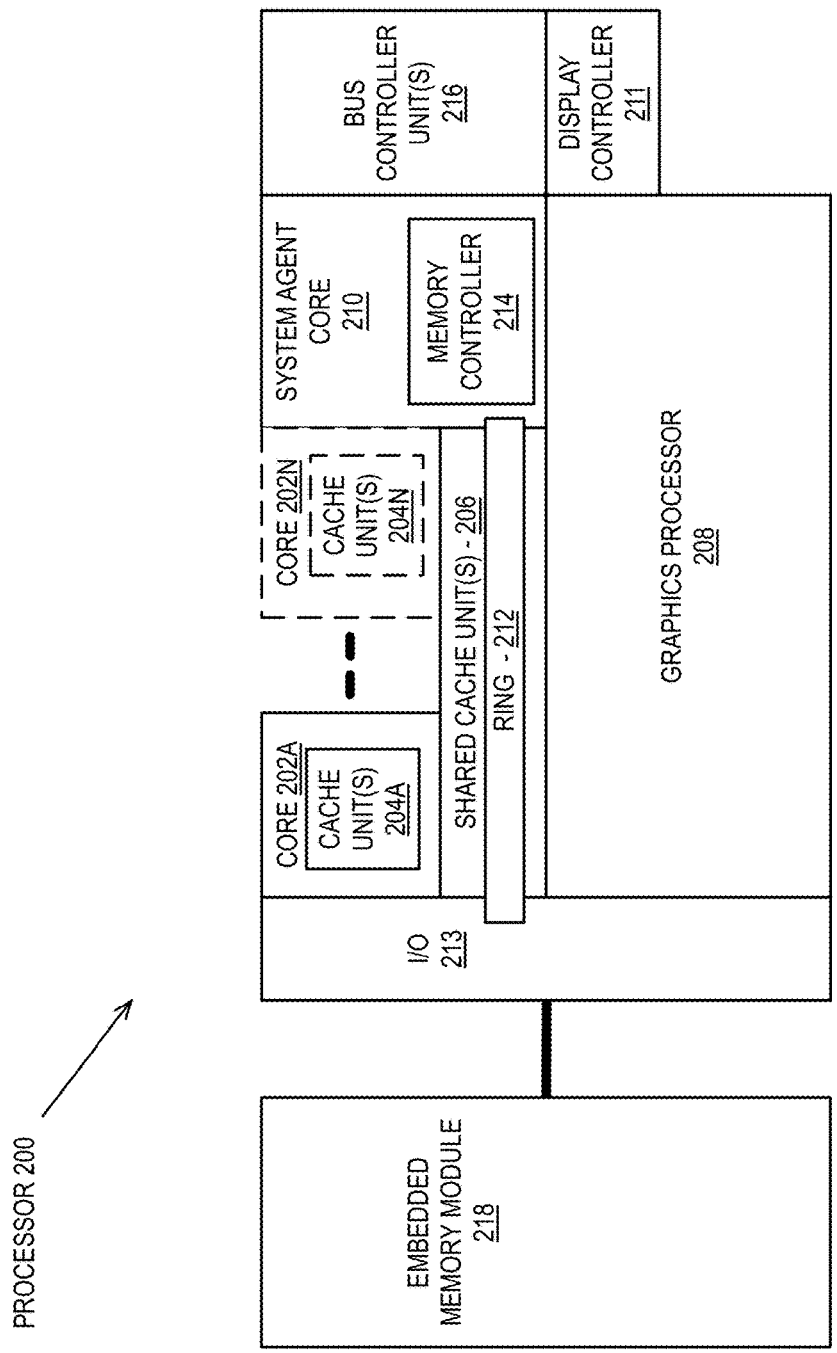
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
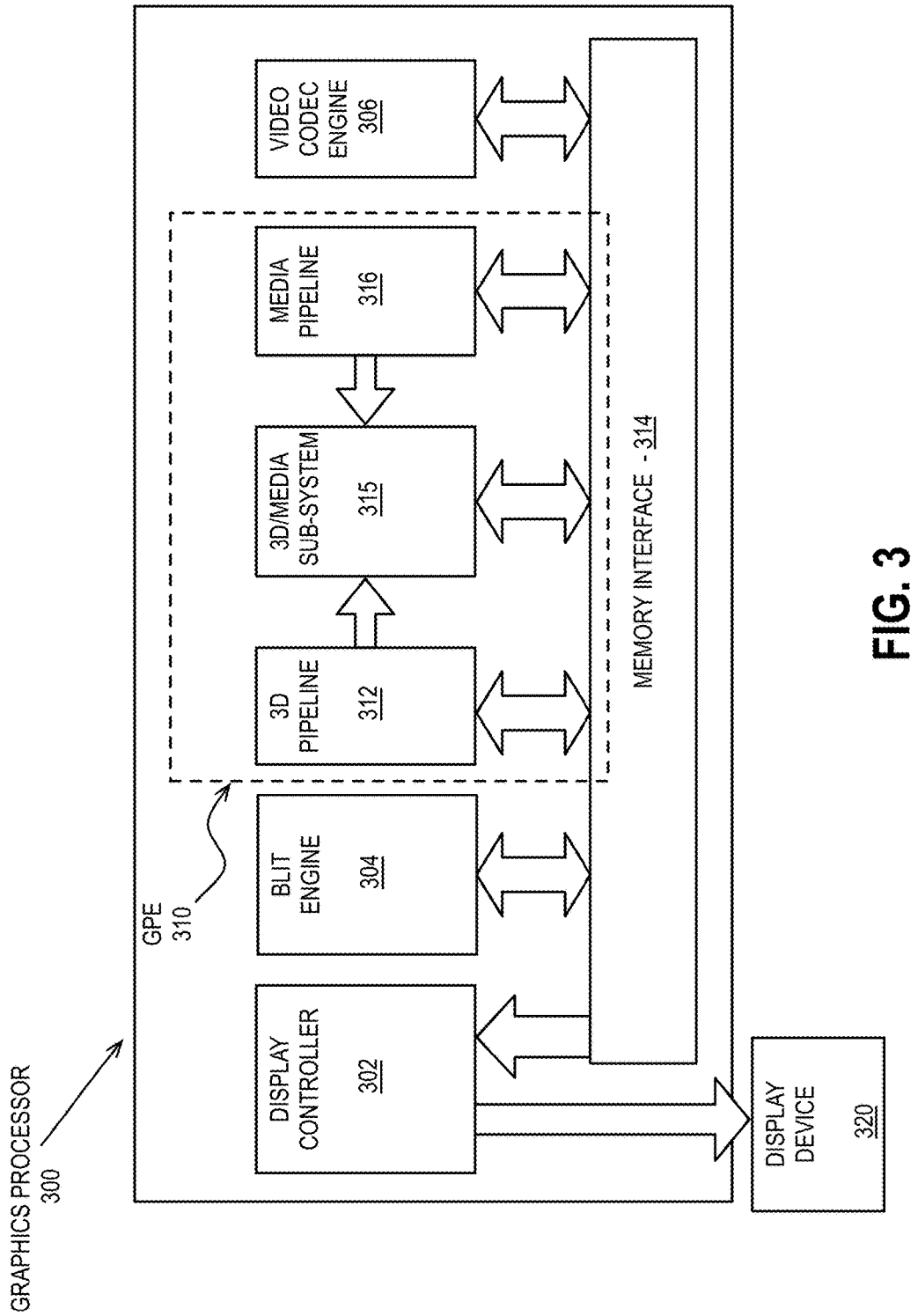
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
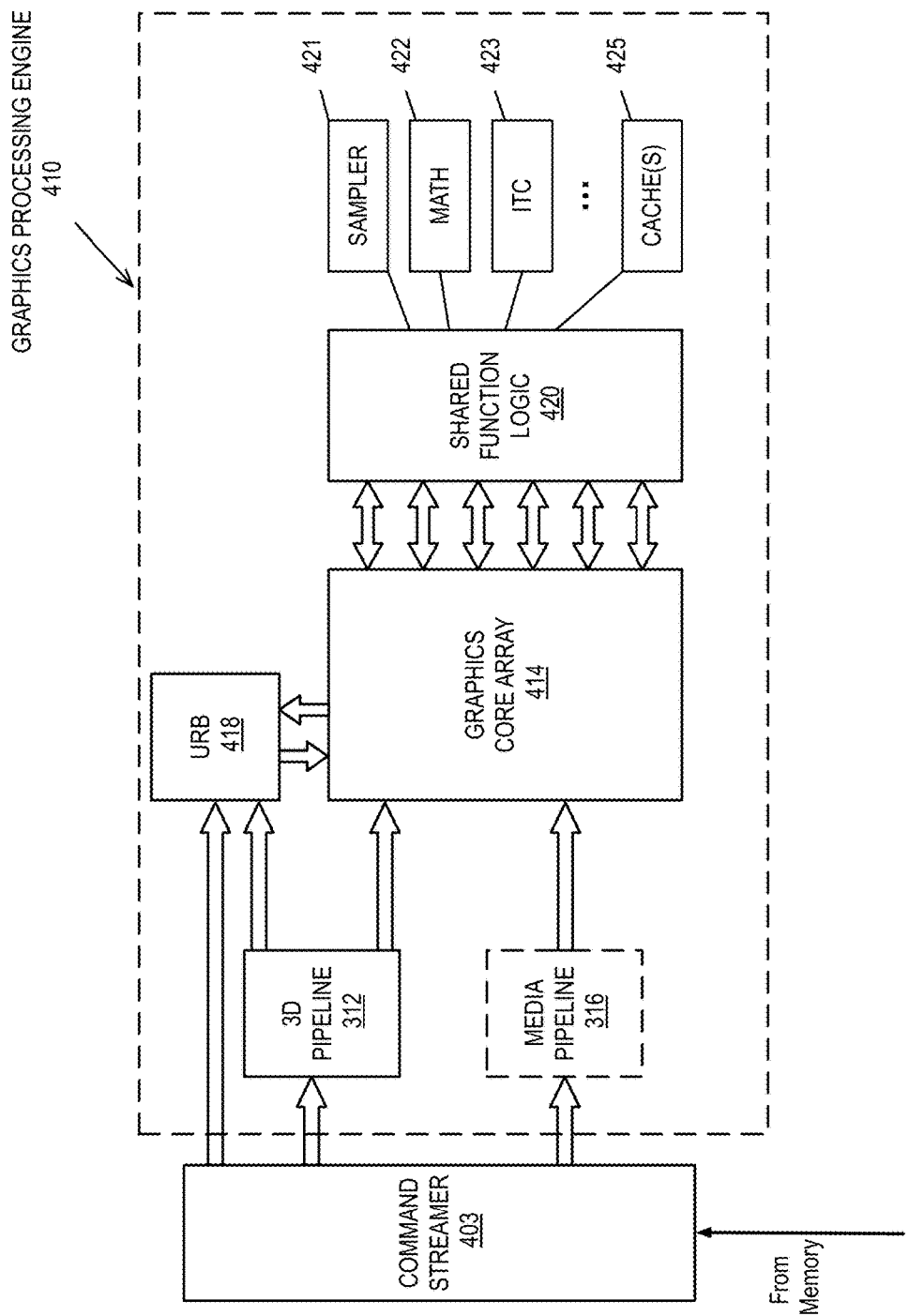
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
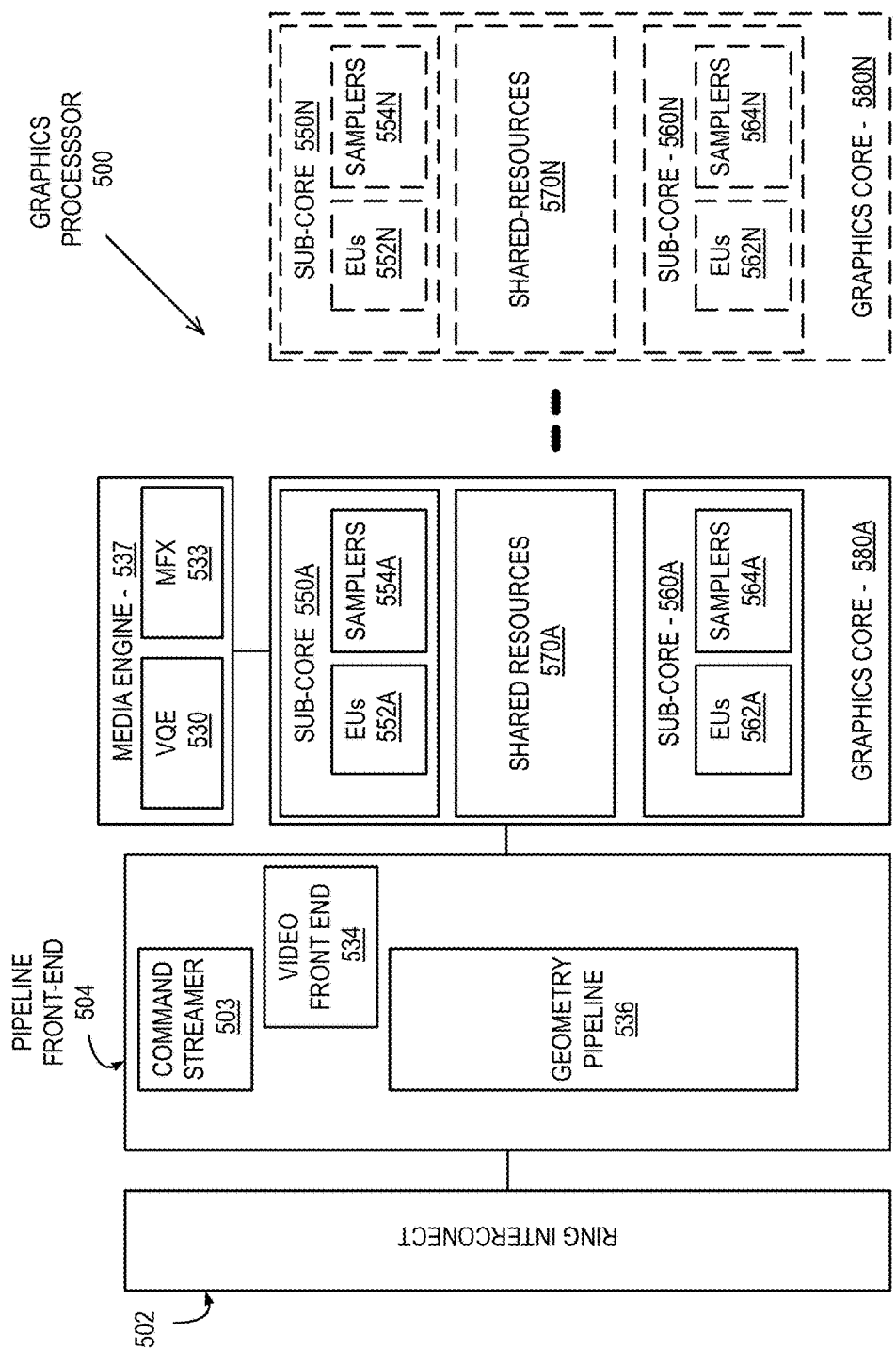
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
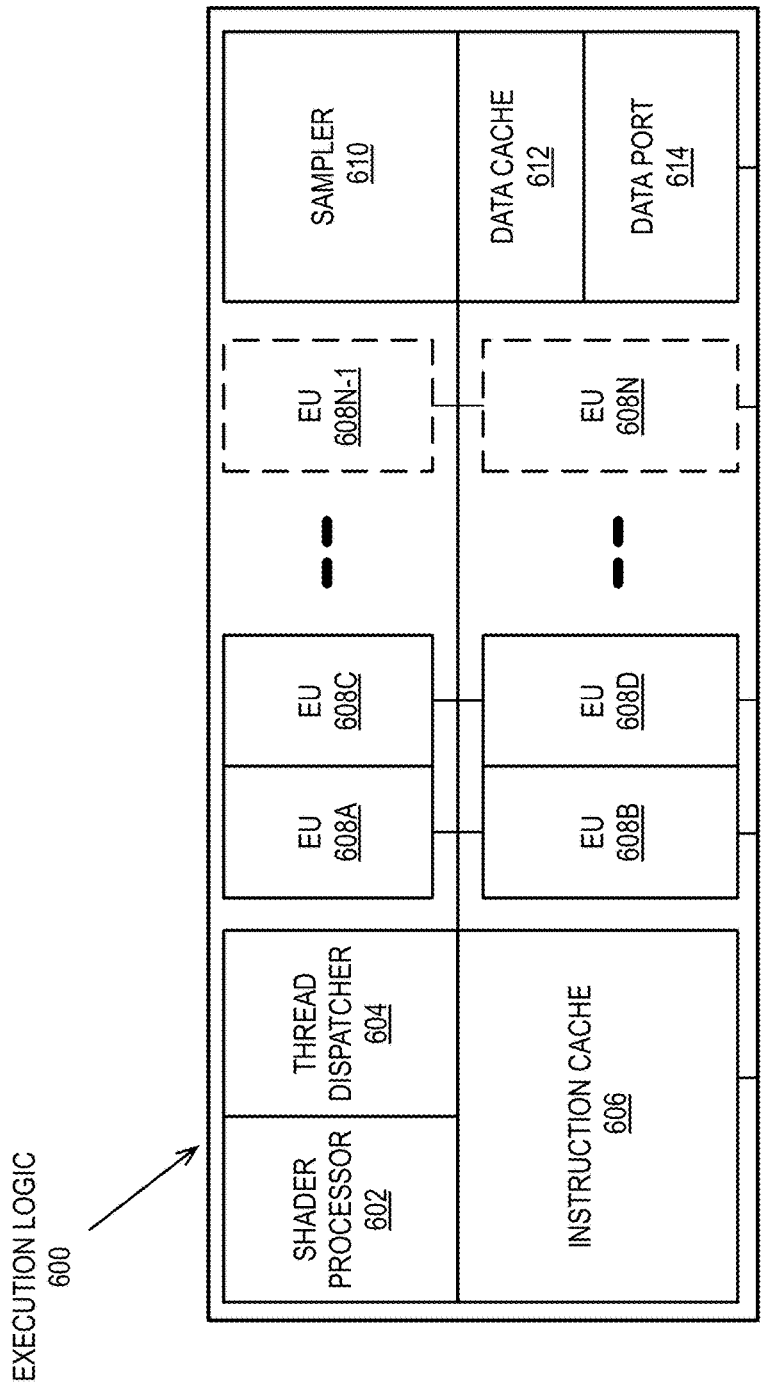
FIG. 6 illustrates thread execution logic including an array of processing elements employed in some embodiments of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
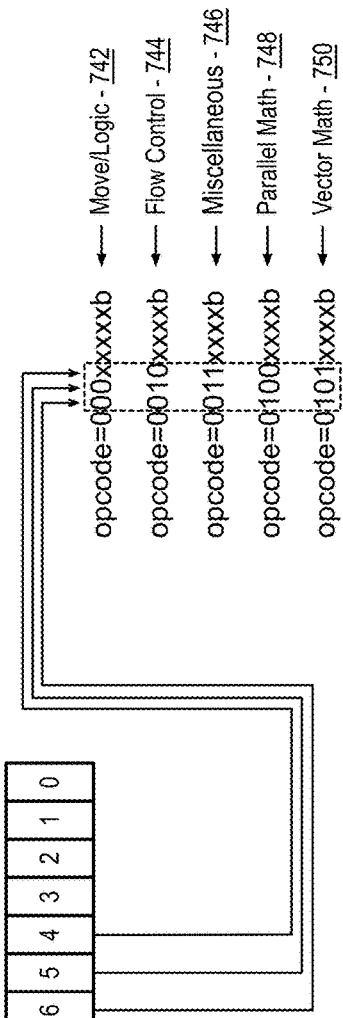
FIG. 7 is a block diagram illustrating a graphics processor instruction formats according to some embodiments.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
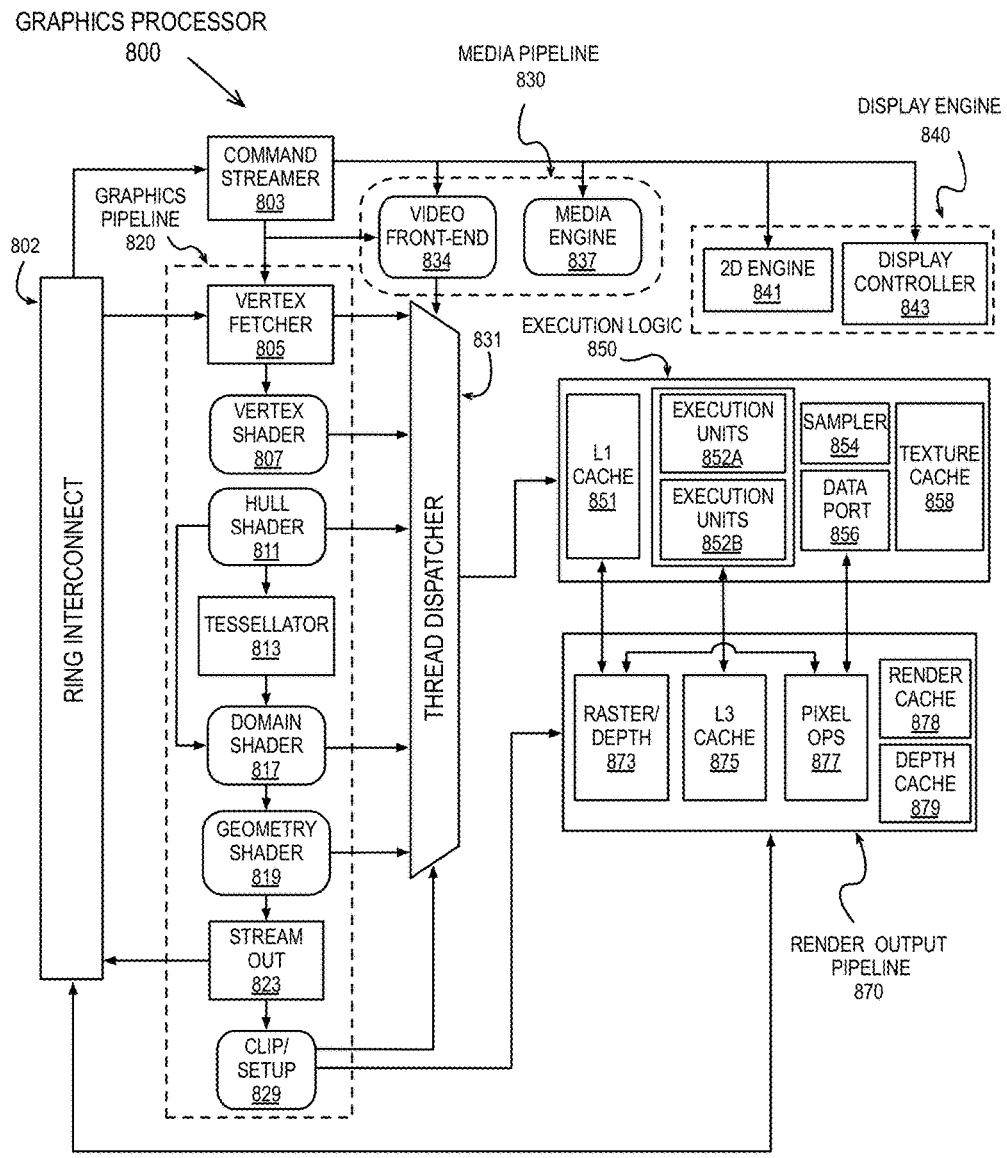
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
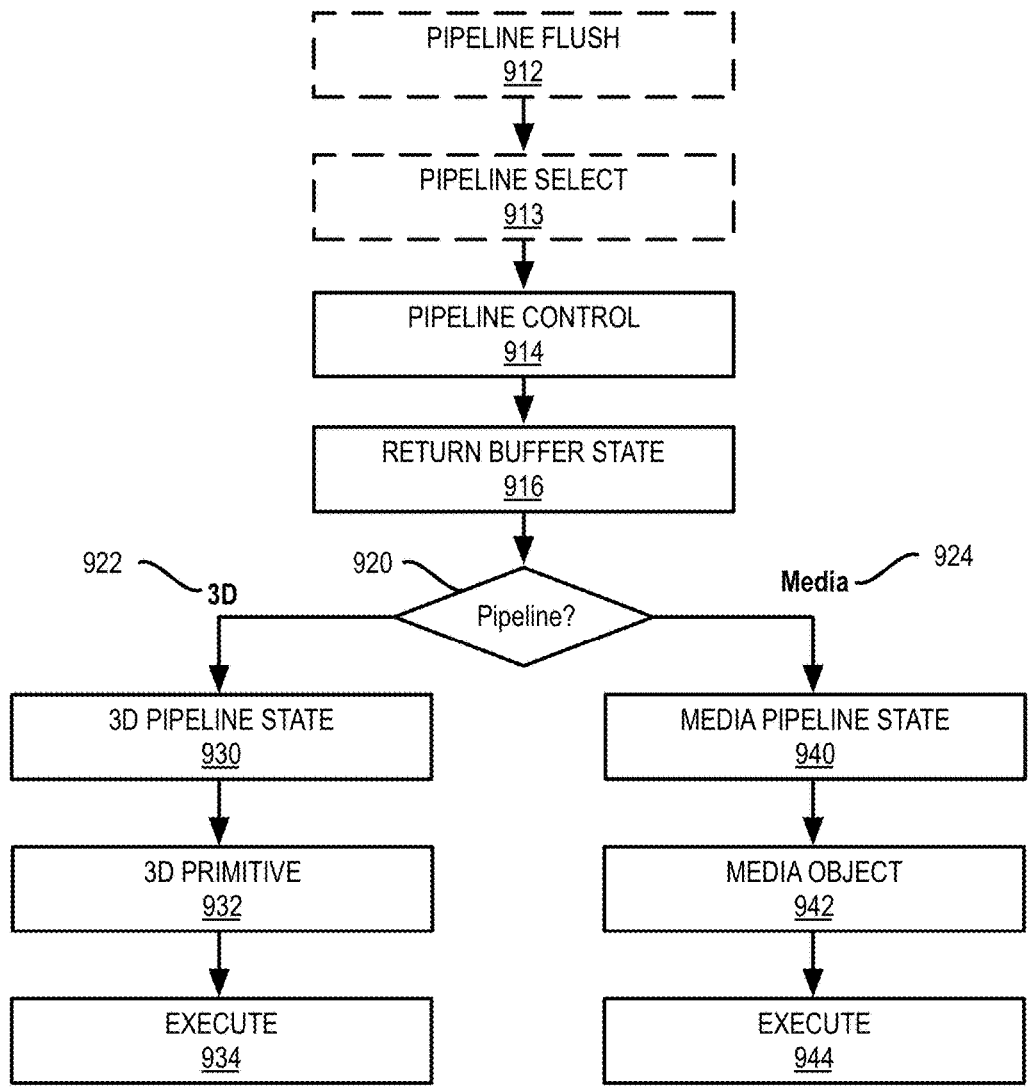
FIG. 9A is a block diagram illustrating a graphics processor command format according to an embodiment and FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, configuring the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
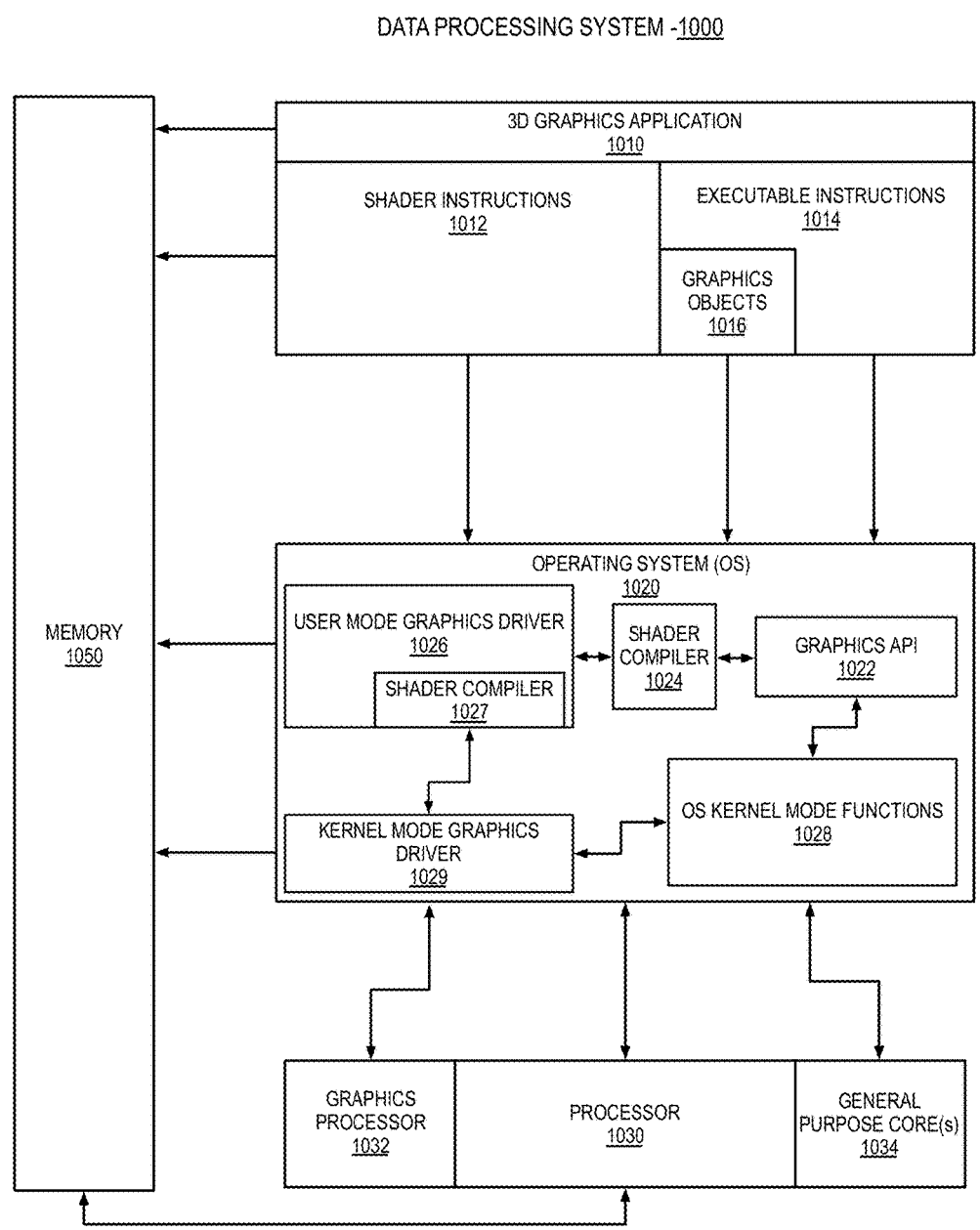
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
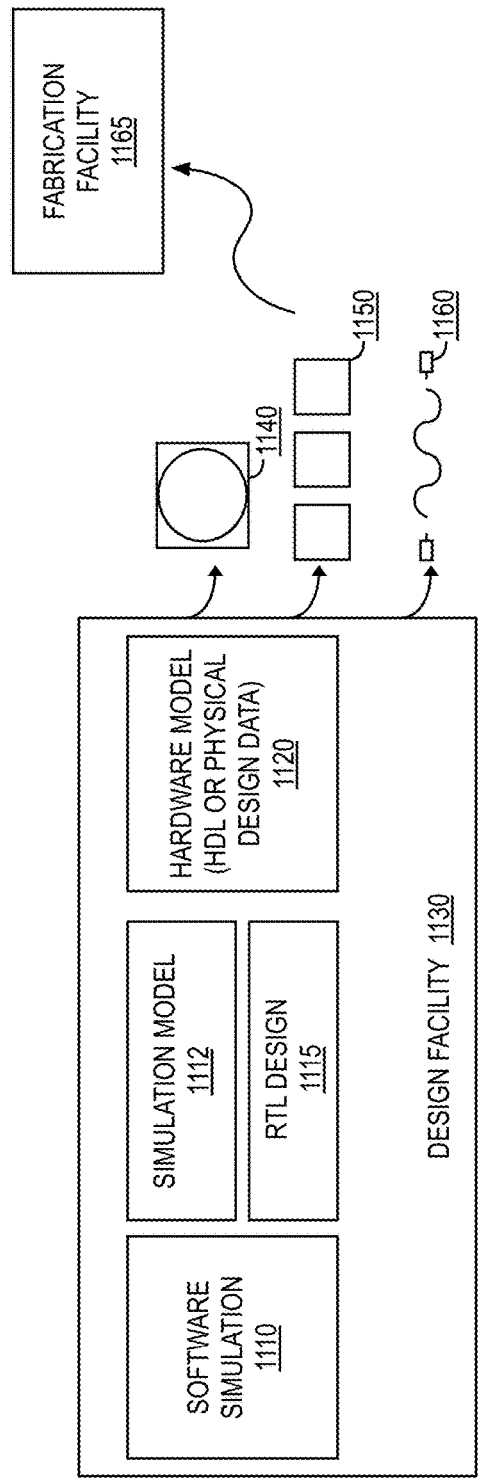
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
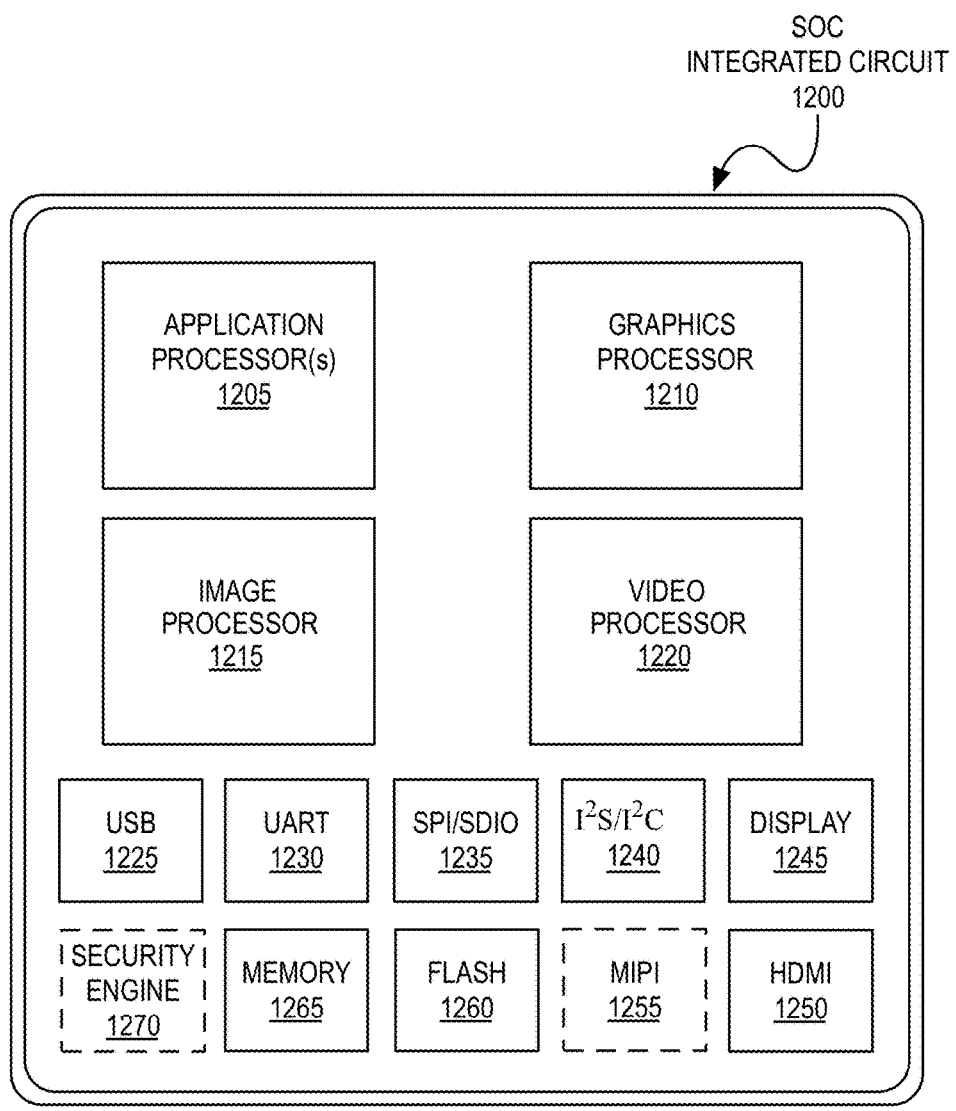
FIG. 12 is a block diagram illustrating an exemplary system on a chip integrated circuit that may be fabricated using one or more IP cores, according to an embodiment.
Figure 13:
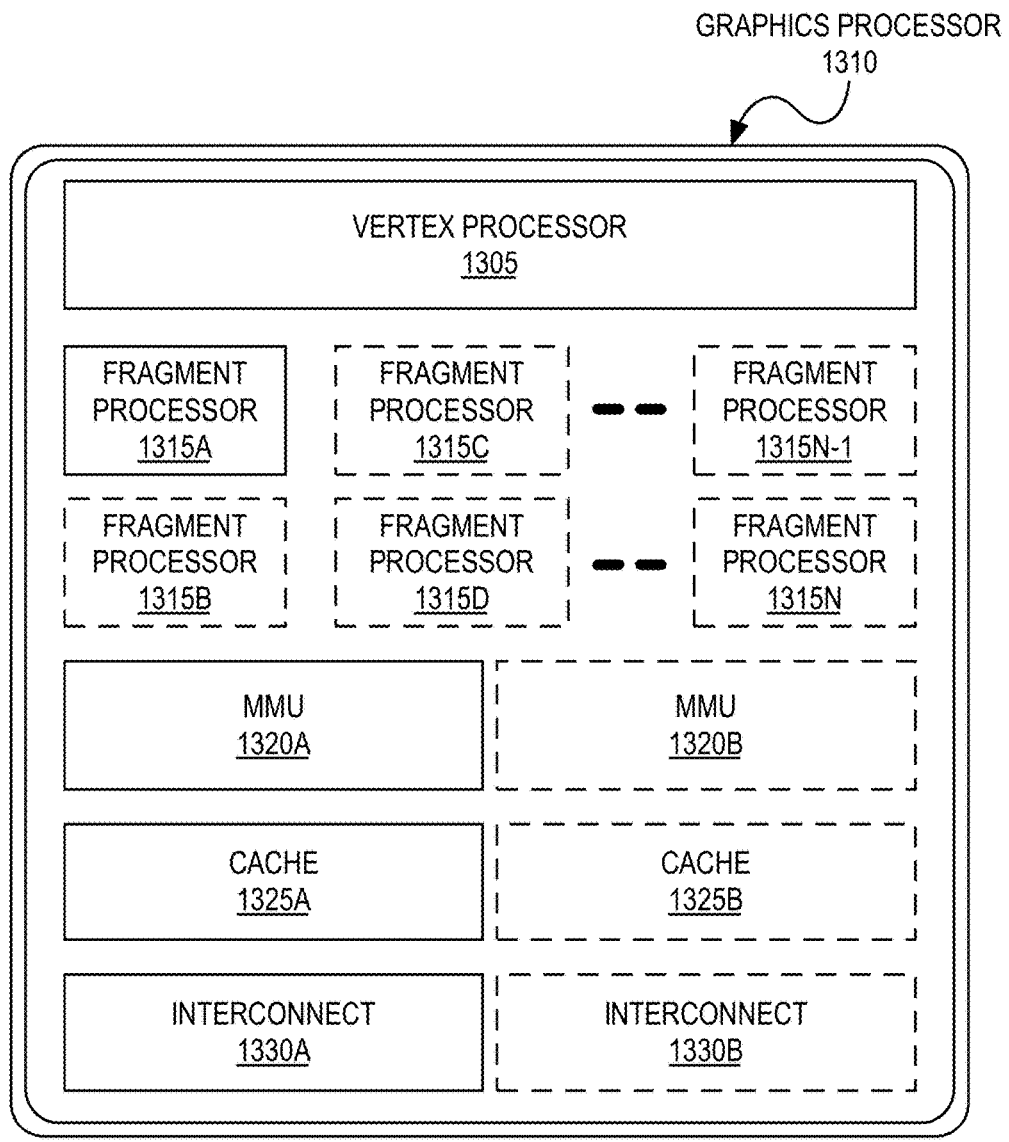
FIG. 13 is a block diagram illustrating an exemplary graphics processor of a system on a chip integrated circuit that may be fabricated using one or more IP cores, according to an embodiment.
Figure 14:
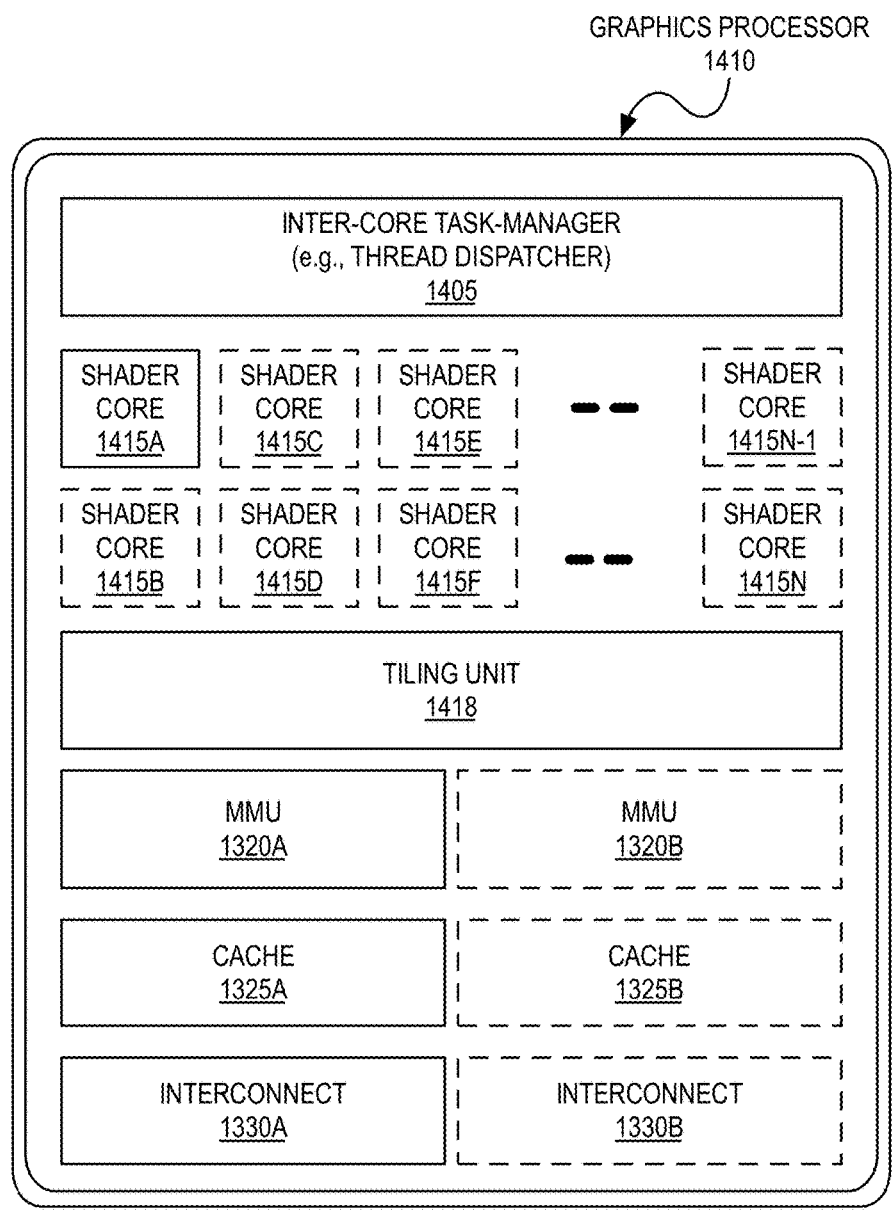
FIG. 14 is a block diagram illustrating an additional exemplary graphics processor of a system on a chip integrated circuit that may be fabricated using one or more IP cores, according to an embodiment.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A-1315N. Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a frame buffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1300, including for the vertex processor 1305 and/or fragment processor(s) 1315A-1315N, which may reference vertex or image/texture data stored in memory, in addition to vertex or image/texture data stored in the one or more cache(s) 1320A-1320B. In one embodiment the one or more MMU(s) 1325A-1325B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, caches 1325A-1325B, and circuit interconnects 1330A-1330B of the integrated circuit 1300 of FIG. 13.

Graphics processor 1410 includes one or more shader core(s) 1415A-1415N, which provides for a unified shader core architecture in which a single core or type or core can execute all types of programmable shader code, including vertex shaders, fragment shaders, and compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Figure 15:
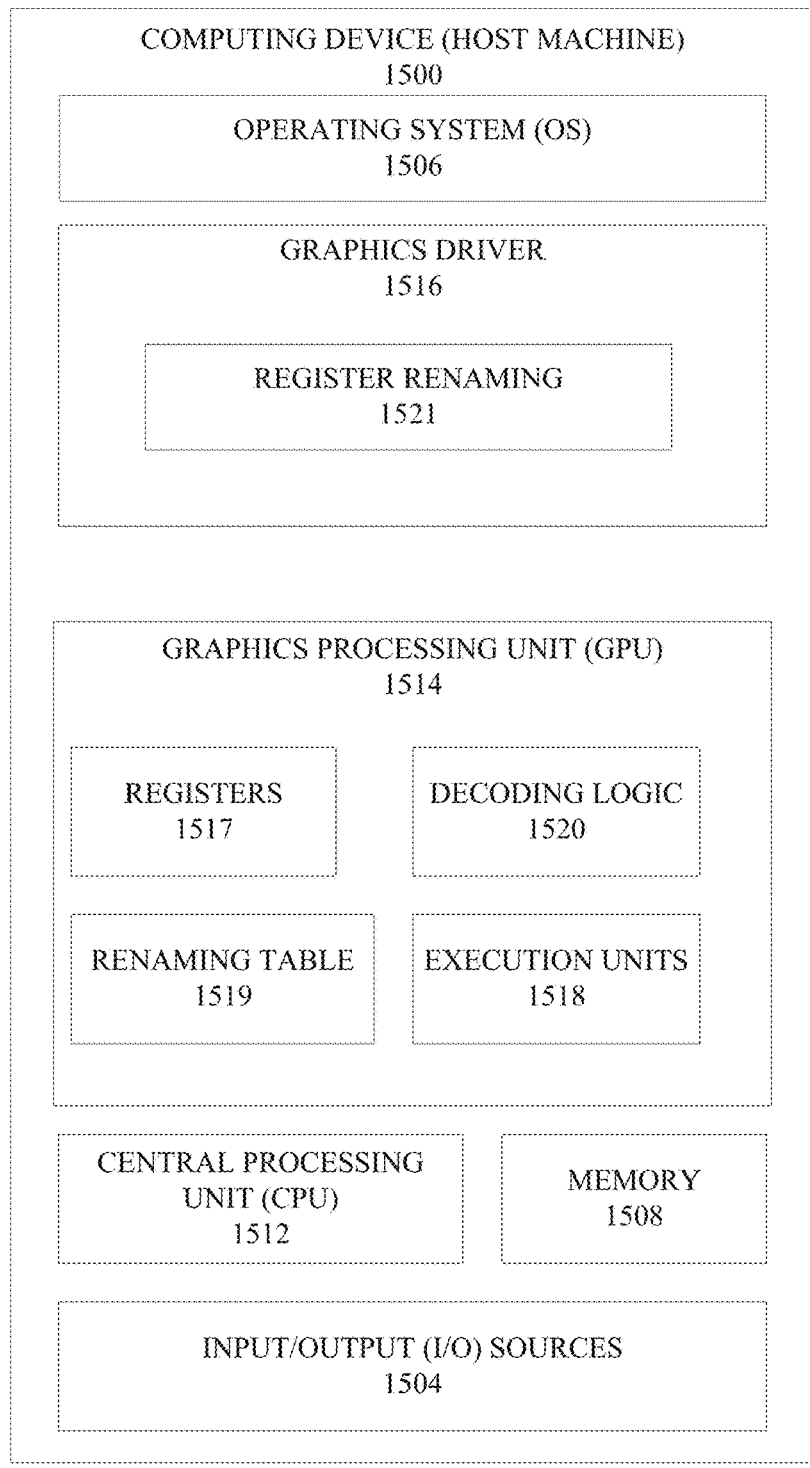
FIG. 15 illustrates one embodiment of a computing device to facilitate register renaming.

FIG. 15 illustrates one embodiment of a computing device 1500. Computing device 1500 (e.g., smart wearable devices, virtual reality (VR) devices, head-mounted display (HMDs), mobile computers, Internet of Things (IoT) devices, laptop computers, desktop computers, server computers, etc.) may be the same as data processing system 100 of FIG. 1 and accordingly, for brevity, clarity, and ease of understanding, many of the details stated above with reference to FIGS. 1-14 are not further discussed or repeated hereafter. As illustrated, in one embodiment, computing device 1500 is shown as hosting register renaming logic 1521.

In the illustrated embodiment, register renaming logic 1521 is shown as being hosted by graphics driver 1516; however, it is contemplated that embodiments are not limited as such. For example, in one embodiment, register renaming logic 1521 may be part of firmware of CPU 1512 or GPU 1514 or, in another embodiment, hosted by operating system 1506. In yet another embodiment, register renaming logic 1521 may be partially and simultaneously hosted by multiple components of computing device 1500, such as one or more of driver 1516, GPU 1514, GPU firmware, operating system 1506, and/or the like.

Throughout the document, the term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 1500 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1500 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 1500 may include a mobile computing device employing a computer platform hosting an integrated circuit ("IC"), such as system on a chip ("SoC" or "SOC"), integrating various hardware and/or software components of computing device 1500 on a single chip.

As illustrated, in one embodiment, computing device 1500 may include any number and type of hardware and/or software components, such as (without limitation) graphics processing unit 1514, graphics driver (also referred to as "GPU driver", "graphics driver logic", "driver logic", user-mode driver (UMD), UMD, user-mode driver framework (UMDF), UMDF, or simply "driver") 1516, central processing unit 1512, memory 1508, network devices, drivers, or the like, as well as input/output (I/O) sources 1504, such as touchscreens, touch panels, touch pads, virtual or regular keyboards, virtual or regular mice, ports, connectors, etc. Computing device 1500 may include operating system (OS) 1506 serving as an interface between hardware and/or physical resources of the computer device 1500 and a user. It is contemplated that CPU 1512 may include one or processors, such as processor(s) 102 of FIG. 1, while GPU 1514 may include one or more graphics processors, such as graphics processor(s) 108 of FIG. 1.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-14, some processes of the graphics pipeline as described above are implemented in software, while the rest are implemented in hardware. A graphics pipeline may be implemented in a graphics coprocessor design, where CPU 1512 is designed to work with GPU 1514 which may be included in or co-located with CPU 1512. In one embodiment, GPU 1514 may employ any number and type of conventional software and hardware logic to perform the conventional functions relating to graphics rendering as well as novel software and hardware logic to execute any number and type of instructions, such as instructions 121 of FIG. 1, to perform the various novel functions of register renaming logic 1521 as disclosed throughout this document.

As aforementioned, memory 1508 may include a random access memory (RAM) comprising application database having object information. A memory controller hub, such as memory controller hub 116 of FIG. 1, may access data in the RAM and forward it to GPU 1514 for graphics pipeline processing. RAM may include double data rate RAM (DDR RAM), extended data output RAM (EDO RAM), etc. CPU 1512 interacts with a hardware graphics pipeline, as illustrated with reference to FIG. 3, to share graphics pipelining functionality. Processed data is stored in a buffer in the hardware graphics pipeline, and state information is stored in memory 1508. The resulting image is then transferred to I/O sources 1504, such as a display component, such as display device 320 of FIG. 3, for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1508 may comprise a pre-allocated region of a buffer (e.g., frame buffer); however, it should be understood by one of ordinary skill in the art that the embodiments are not so limited, and that any memory accessible to the lower graphics pipeline may be used. Computing device 1500 may further include input/output (I/O) control hub (ICH) 130 as referenced in FIG. 1, one or more I/O sources 1504, etc.

CPU 1512 may include one or more processors to execute instructions in order to perform whatever software routines the computing system implements. The instructions frequently involve some sort of operation performed upon data. Both data and instructions may be stored in system memory 1508 and any associated cache. Cache is typically designed to have shorter latency times than system memory 1508; for example, cache might be integrated onto the same silicon chip(s) as the processor(s) and/or constructed with faster static RAM (SRAM) cells whilst the system memory 1508 might be constructed with slower dynamic RAM (DRAM) cells. By tending to store more frequently used instructions and data in the cache as opposed to the system memory 1508, the overall performance efficiency of computing device 1500 improves. It is contemplated that in some embodiments, GPU 1514 may exist as part of CPU 1512 (such as part of a physical CPU package) in which case, memory 1508 may be shared by CPU 1512 and GPU 1514 or kept separated.

System memory 1508 may be made available to other components within the computing device 1500. For example, any data (e.g., input graphics data) received from various interfaces to the computing device 1500 (e.g., keyboard and mouse, printer port, Local Area Network (LAN) port, modem port, etc.) or retrieved from an internal storage element of the computer device 1500 (e.g., hard disk drive) are often temporarily queued into system memory 1508 prior to their being operated upon by the one or more processor(s) in the implementation of a software program. Similarly, data that a software program determines should be sent from the computing device 1500 to an outside entity through one of the computing system interfaces, or stored into an internal storage element, is often temporarily queued in system memory 1508 prior to its being transmitted or stored.

Further, for example, an ICH, such as ICH 130 of FIG. 1, may be used for ensuring that such data is properly passed between the system memory 1508 and its appropriate corresponding computing system interface (and internal storage device if the computing system is so designed) and may have bi-directional point-to-point links between itself and the observed I/O sources/devices 1504. Similarly, an MCH, such as MCH 116 of FIG. 1, may be used for managing the various contending requests for system memory 1508 accesses amongst CPU 1512 and GPU 1514, interfaces and internal storage elements that may proximately arise in time with respect to one another.

I/O sources 1504 may include one or more I/O devices that are implemented for transferring data to and/or from computing device 1500 (e.g., a networking adapter); or, for a large scale non-volatile storage within computing device 1500 (e.g., hard disk drive). User input device, including alphanumeric and other keys, may be used to communicate information and command selections to GPU 1514. Another type of user input device is cursor control, such as a mouse, a trackball, a touchscreen, a touchpad, or cursor direction keys to communicate direction information and command selections to GPU 1514 and to control cursor movement on the display device. Camera and microphone arrays of computer device 1500 may be employed to observe gestures, record audio and video and to receive and transmit visual and audio commands.

Computing device 1500 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1500 may vary from implementation to implementation depending upon numerous factors, such as price constraints, performance requirements, technological improvements, or other circumstances. Examples of the electronic device or computer system 1500 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

According to one embodiment, GPU 1514 includes a register file (or registers) 1517 to store data during graphics processing. As discussed above, register allocation is important for highly parallel execution of multiple hardware contexts. In conventional GPUs, the physical registers are statically partitioned so that each hardware context can utilize only a fixed number of registers. Therefore the level of parallelism is often limited by the number of available registers. Thus, conventional GPUs implement a static sharing scheme that boosts the number of parallel contexts.

Figure 16:
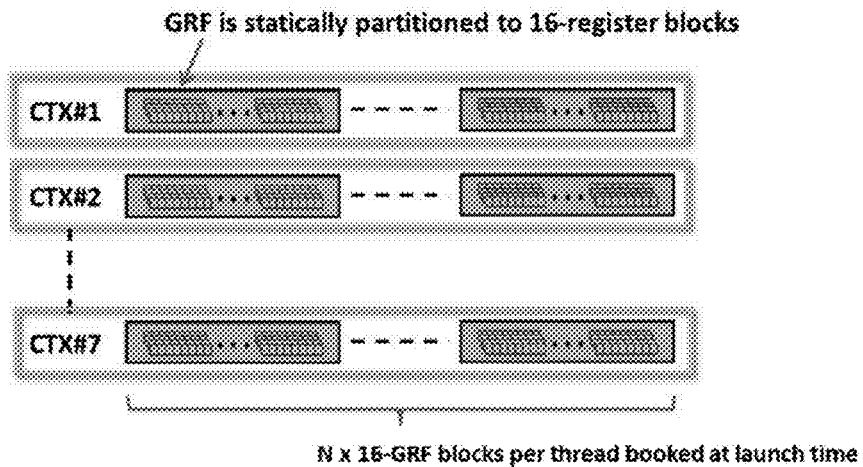
FIG. 16 illustrates a conventional register configuration.

FIG. 16 illustrates such a conventional static register sharing scheme in which the register file is statically partitioned into sixteen register blocks. With this design, the system can adjust the number of register blocks allocated to each context at launch time. Therefore, the number of register blocks acquired per context will be lower for a low register demand kernel, with the remaining register blocks being utilized to launch more active contexts. However in this approach, the register blocks allocated to each context must be sufficiently large to accommodate the maximum number of registers required to run the complete kernel. However, this does not account for the actual register usage variation at different execution times. As a result, register allocation is inefficient since each context will have some overbooked registers that are only utilized at certain program points.

Figure 17:
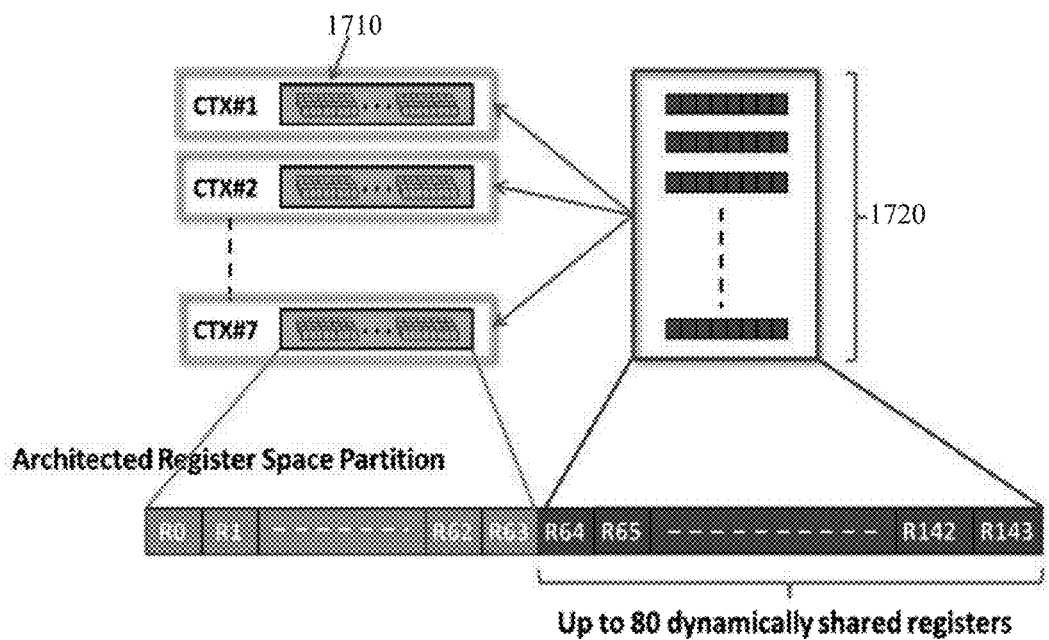
FIG. 17 illustrates one embodiment of a register space partition.

According to one embodiment, register renaming logic 1521 performs dynamic register sharing. In such an embodiment, register renaming logic 1521 facilitates dynamic register renaming of registers 1517 within GPU 1514 by logically partitioning the register space into a fixed portion and a shared portion. FIG. 17 illustrates one embodiment of a partitioning of registers 1517 into a fixed register 1710 component and a shared register 1720 component. As shown in FIG. 17, fixed registers 1710 comprise registers R0-R63, while shared registers 1720 comprise registers R64-R143. According to one embodiment, shared registers 1720 are dynamically renamed to a shared physical register during kernel execution. Thus, the number of shared registers 1720 is larger than 64 in order to decrease the chance of spilling for large benchmarks. In other embodiments, the register partition size may be adjusted based on GPU characteristics.

Referring back to FIG. 15, register renaming logic 1521 assigns all variables based on the complete register 1517 space during compiling of a GPU 1514 kernel. In one embodiment, register renaming logic 1521 performs a register allocation (RA) algorithm to bias global variables with long live ranges to be assigned to fixed registers 1710 (e.g., the lower 64 registers of registers 1517), which maximizes fixed register utilization and reduces shared register contention. In a further embodiment, variables having short live ranges are assigned to shared registers 1720 (e.g., R64-R143) to reduce duration of occupying a shared register, and increase the chance of time sharing among multiple contexts. In instances in which register assignments exceeds the total architected register space (e.g., >143), register renaming logic 1521 facilitates compiling to generate spill code within the same context that performs spill code clean up to avoid unnecessary spills/fills.

In one embodiment, GPU 1514 also includes execution units (EUs) 1518 to execute contexts, renaming table 1519 and execution decoding logic 1520. In one embodiment, GPU 1514 includes up to 72 EUs 1518. However other embodiments may include other EU configurations. In a further embodiment, decoding logic 1520 is configured to process fixed and shared register operands during kernel execution by performing dynamic register renaming using renaming tables 1519.

Figure 18:
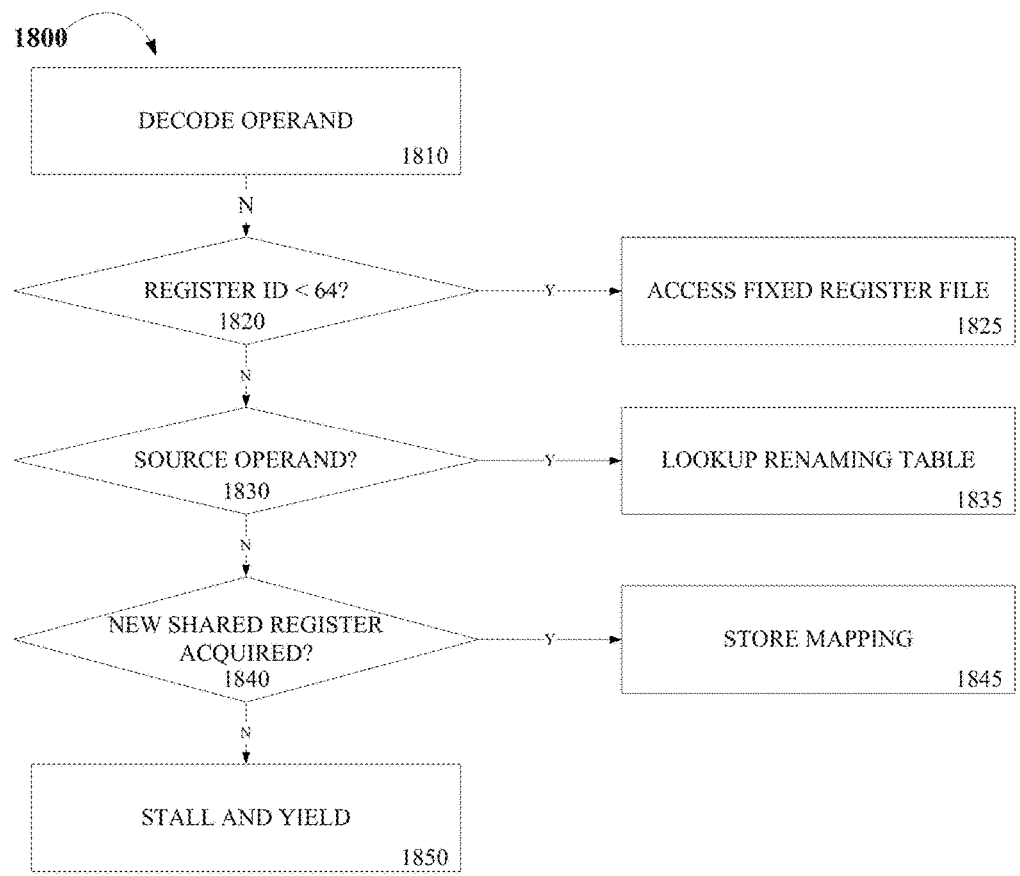
FIG. 18 is a flow diagram illustrating one embodiment of a register renaming process.

FIG. 18 illustrates a method 1800 for facilitating register renaming. Method 1800 may be performed by processing logic that may comprise hardware (e.g., circuitry, dedicated logic, programmable logic, etc.), software (such as instructions run on a processing device), or a combination thereof. The processes of method 1800 are illustrated in linear sequences for brevity and clarity in presentation; however, it is contemplated that any number of them can be performed in parallel, asynchronously, or in different orders. For brevity, many of the details discussed with reference to the preceding figures may not be discussed or repeated hereafter.

Method 1800 begins at processing block 1810 at which an operand is decoded. According to one embodiment, decoding logic 1520 distinguishes a fixed from a shared register operand based on a register ID. Thus at decision block 1820, a determination is made as to whether the register ID of the operand is less than the start location of the shared register range (e.g., 64). If the register ID is less than 64, the EU 1518 performs an operation by accessing fixed registers 1710, processing block 1825. Otherwise, a determination is made as to whether the operand is a source operand, decision block 1830. Upon determining that the operand is a source operand, a lockup is performed at renaming table 1519 to find the dynamically allocated physical register corresponding to the register ID and the operand is fetched from shared registers 1720, processing block 1835.

Upon determining that the operand is not a source operand (e.g., a destination operand), a determination is made as to whether a new shared register 1720 can be acquired, decision block 1840. If a new shared register can be acquired, a mapping of the shared register 1720 to the physical register ID is stored in renaming table 159 for future lookup, processing block 1845. If no free shared register is currently available, the current context is stalled and decoding is yielded to another context, processing block 1850. In one embodiment, other threads that have ready instructions to continue execution effectively hide the stall latency. It is likely that other contexts have passed the high-register pressure region, and thus have freed registers to enable the stalled context to make progress.

According to one embodiment, register renaming logic 1521 instructs an GPU 1514 when a dynamically allocated register is to be released to enable the register to be used in future renaming requests. In a further embodiment, register renaming logic 1521 facilitates this process via compiler support. In such an embodiment, the release location for a variable may be marked based on information computed during register allocation, using the rules shown in Table 1.

TABLE 1

| | |
|---|---|
| Local Variable (e.g., defined and used inside a single basic-block) | Mark location to be released after the last use before a new full definition. |
| Global Variable | Mark location to be released at the immediate post-dominator in control flow graph for basic blocks that include last uses of a previous definition. |

Figure 19A:
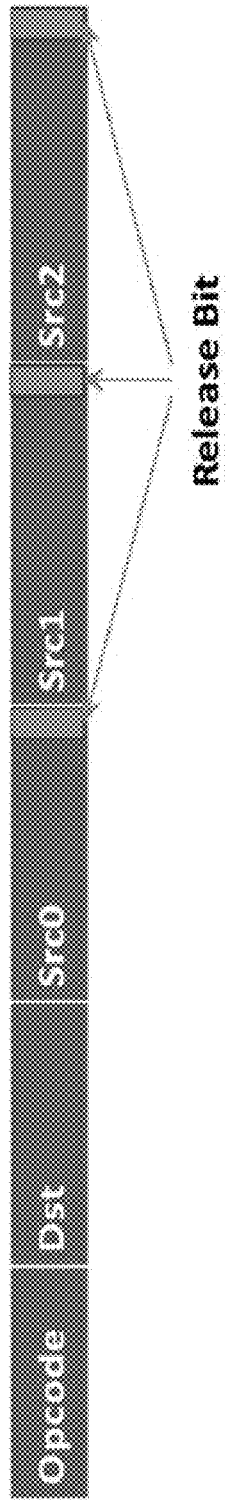
FIGS. 19A & 19B illustrate embodiments for variable bit releases.
Figure 19B:
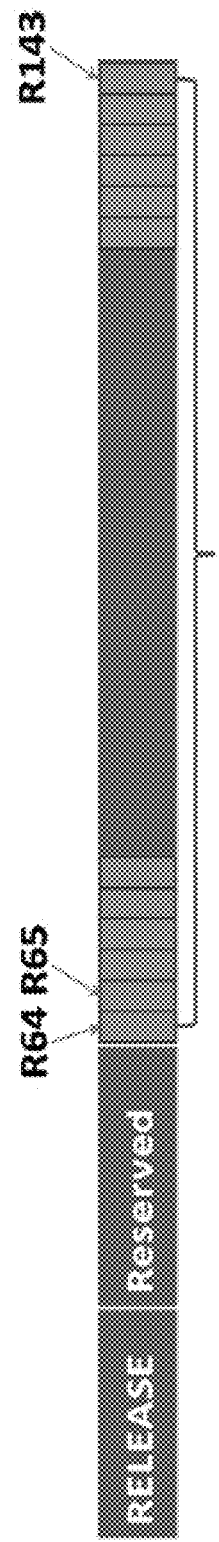

According to one embodiment, full definition of a vector variable is determined. Such definitions may be partially written by Single instruction, multiple data (SIMD), instructions. FIGS. 19A & 19B illustrate variable release implementations using an instruction set architecture (ISA). For a local variable, a last use instruction is augmented to mark a source operand that is to be released since there is a single last use in the same basic block. Thus, three additional bits may be implemented to encode release information in an embodiment that supports up to three source operands. FIG. 19A illustrates such a local variable release implementation.

In the case of global variables, all operands are marked that are to be released at the entry of the corresponding basic block since it is possible for multiple global variables to have a common immediate post-dominator. FIG. 19B illustrates such a global variable release implementation that includes a new RELEASE instruction with bit-fields. As shown in FIG. 19B, the new opcode is encoded with 7 bits to be compatible with an ISA format. Moreover, the last 80 bits are used to represent shared registers 1720, in which a bit is set if the corresponding shared register should be released. Further, middle bits are reserved, and may be leveraged to help prevent deadlock.

According to one embodiment, hardware contexts may be scheduled to run on an EU 1518 in a timesharing fashion in which register renaming logic 1521 enables full leveraging of the temporal register pressure fluctuation observed in most GPU kernels to achieve effective dynamic register sharing. However, general dynamic register sharing may introduce deadlock scenarios such that no thread can make forward progress. Such deadlock scenarios may occur: when the register demand from a single large thread exceeds the shared register file size; when multiple threads enter high register pressure regions simultaneously, and not enough registers are freed in time; and when multiple threads are blocked on a synchronization event, while no more free register is available for the lagging threads.

In one embodiment, deadlock due to single thread starvation is avoided because any register demand exceeding the architected register space will be handled by compiler generated spill code. In a further embodiment, multi-thread starvation without synchronization is prevented by changing EU 1518 context scheduler policy to take into account dynamic register usage. Before launching a new context, the EU 1518 verifies whether the following condition is satisfied:

$$\forall \text{ any launched context } i: F > M_i - R_i,$$

where F is the number of remaining free shared registers and $R_i$ is the number of shared registers already allocated to context i.

In one embodiment, $M_i$ is initially set to the peak register demand statically determined for context i. In such an embodiment, $M_i$ may be refined gradually when executing inserted RELEASE instructions by leveraging the reserved bits to encode the remaining maximal register usage until kernel end. For SIMD kernels running, this information can be conveniently found out from a global linear scan pass after RA as the code is laid out in reverse post-order of the control flow graph. By enforcing this policy, register renaming logic 1521 makes sure that there will be a sufficient amount of free registers reserved for at least one thread to make forward progress at any given time.

Furthermore, register renaming logic 1521 reduces unnecessary throttling of other threads once a kernel has passed a peak register pressure region. This is done by refining the maximal register usage, rather than always assuming the worst case throughout the entire kernel execution. To prevent multithread starvation with synchronization, without additional hardware support, an approach may be taken by limiting the number of launched contexts according to the maximum register demand from each kernel, which is bounded by the architected register space size. Alternatively, more contexts may be allowed to launch. However in case of a deadlock, GPU 1514 is relied upon to spill registers occupied by a thread stalled at a synchronization barrier to allow other threads to make forward progress.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a graphics processing unit (GPU), including a plurality of execution units to process graphics context data and a register file having a plurality of registers to store the graphics context data; and register renaming logic to facilitate dynamic renaming of the plurality of registers by logically partitioning the plurality of registers in the register file into a set of fixed registers and a set of shared registers.

Example 2 includes the subject matter of Example 1, wherein the set of shared registers are dynamically renamed to a shared physical register during execution of a context at an execution unit.

Example 3 includes the subject matter of Examples 1 and 2, wherein the GPU further comprises a renaming table to store the renaming of each register within the set of shared registers to a shared physical register and decoding logic to perform register renaming of operands from the set of fixed registers and operands from the set of shared registers during execution of the context via the renaming table.

Example 4 includes the subject matter of Examples 1-3, wherein the register renaming comprises determining whether a register ID of an operand of the context is less than a starting range of the set of shared registers and accessing the set of fixed registers to perform an operation on the operand upon determining that the operand is less than the starting range of the set of shared registers.

Example 5 includes the subject matter of Examples 1-4, wherein the register renaming further comprises determining whether the operand is a source operand upon determining that the operand is greater than the starting range of the set of shared registers, accessing the renaming table to find a physical register corresponding to the register ID upon determining that the operand is a source operand and fetching the operand from the set of shared registers.

Example 6 includes the subject matter of Examples 1-5, wherein the register renaming further comprises determining whether a new shared register can be acquired upon determining that the operand is not a source operand and storing a mapping of the shared register to a physical register ID in the renaming table upon determining that the new shared register can be acquired.

Example 7 includes the subject matter of Examples 1-6, wherein the register renaming further comprises stalling the context upon determining that the new shared register can not be acquired.

Example 8 includes the subject matter of Examples 1-7, wherein the register renaming logic assigns variables based on the plurality of registers during compiling of a GPU kernel.

Example 9 includes the subject matter of Examples 1-8, wherein the register renaming logic performs a register allocation algorithm to assign variables having long live ranges to the set of fixed registers and assign variables having short live ranges to the set of shared registers.

Example 10 includes the subject matter of Examples 1-9, wherein the register renaming logic facilitates the generation of spill code upon a determination that register assignments exceed the plurality of registers on the register file.

Example 11 includes the subject matter of Examples 1-10, wherein the register renaming logic provides instructions as to when a register in the set of shared registers is to be released.

Example 12 includes the subject matter of Examples 1-11, wherein a release location for a variable is marked based on information computed during the register allocation algorithm.

Example 13 includes the subject matter of Examples 1-12, wherein a location of a local variable is marked to be released after a final last use before a new full definition.

Example 14 includes the subject matter of Examples 1-13, wherein a location of a global variable is marked to be released at an immediate post-dominator in a control flow graph for basic blocks that include last uses of a previous definition.

Some embodiments pertain to Example 15 that includes a graphics processing unit (GPU) comprising a plurality of execution units to process graphics context data, a register file having a plurality of registers to store the graphics context data, decoding logic to perform register renaming of operands from a set of fixed registers and operands from a set of shared registers during execution of a context and a renaming table to store the renaming of each register within the set of shared registers to a shared physical register.

Example 16 includes the subject matter of Example 15, wherein the register renaming comprises determining whether a register ID of an operand of the context is less than a starting range of the set of shared registers and accessing the set of fixed registers to perform an operation on the operand upon determining that the operand is less than the starting range of the set of shared registers.

Example 17 includes the subject matter of Examples 15 and 16, wherein the register renaming further comprises determining whether the operand is a source operand upon determining that the operand is greater than the starting range of the set of shared registers, accessing the renaming table to find a physical register corresponding to the register ID upon determining that the operand is a source operand and fetching the operand from the set of shared registers.

Example 18 includes the subject matter of Examples 15-17, wherein the register renaming further comprises determining whether a new shared register can be acquired upon determining that the operand is not a source operand and storing a mapping of the shared register to a physical register ID in the renaming table upon determining that the new shared register can be acquired.

Example 19 includes the subject matter of Examples 15-18, wherein the register renaming further comprises stalling the context upon determining that the new shared register can not be acquired.

Example 20 includes the subject matter of Examples 15-19, further comprising register renaming logic to facilitate dynamic renaming of the plurality of registers by logically partitioning the plurality of registers in the register file into a set of fixed registers and a set of shared registers.

Some embodiments pertain to Example 21 that includes a method comprising receiving graphics context operands at a graphics processing unit (GPU) execution unit, decoding the operands and performing register renaming of the operands from a set of fixed registers and operands from a set of shared registers during execution of the graphics contexts.

Example 22 includes the subject matter of Example 21, wherein the register renaming comprises determining whether a register ID of an operand of the context is less than a starting range of the set of shared registers and accessing the set of fixed registers to perform an operation on the operand upon determining that the operand is less than the starting range of the set of shared registers.

Example 23 includes the subject matter of Examples 21 and 22, wherein the register renaming further comprises determining whether the operand is a source operand upon determining that the operand is greater than the starting range of the set of shared registers, accessing the renaming table to find a physical register corresponding to the register ID upon determining that the operand is a source operand and fetching the operand from the set of shared registers.

Example 24 includes the subject matter of Examples 21-23, further comprises determining whether a new shared register can be acquired upon determining that the operand is not a source operand and storing a mapping of the shared register to a physical register ID in the renaming table upon determining that the new shared register can be acquired.

Example 25 includes the subject matter of Examples 21-24, wherein the register renaming further comprises stalling the context upon determining that the new shared register can not be acquired.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
a graphics processor including:
a plurality of execution units to process graphics context data;
a register file having a plurality of registers to store the graphics context data; and
register renaming logic to facilitate dynamic renaming of the plurality of registers by logically partitioning the plurality of registers in the register file into a set of fixed registers and a set of shared registers, wherein a size of the set of shared registers is adjustable and larger than the set of fixed registers, wherein renaming includes dynamically renaming a variable assigned to a shared register to a unified physical register file that is shared by hardware contexts associated with an execution unit, wherein the variable is assigned during kernel execution.

2. The apparatus of claim 1, wherein the graphics processor further comprises:
a renaming table to store the renaming of each register within the set of shared registers to a shared physical register, wherein the set of shared registers contains greater than 64 registers; and decoding logic to perform register renaming of operands from the set of fixed registers and operands from the set of shared registers during execution of the context via the renaming table.

3. The apparatus of claim 2, wherein the register renaming comprises:
determining whether a register identification (ID) of an operand of the context is less than a starting range of the set of shared registers; and
accessing the set of fixed registers to perform an operation on the operand upon determining that the operand is less than the starting range of the set of shared registers.

4. The apparatus of claim 3, wherein the register renaming further comprises:
determining whether the operand is a source operand upon determining that the operand is greater than the starting range of the set of shared registers;
accessing the renaming table to find a physical register corresponding to the register ID upon determining that the operand is a source operand; and
fetching the operand from the set of shared registers.

5. The apparatus of claim 4, wherein the register renaming further comprises:
determining whether a new shared register can be acquired upon determining that the operand is not a source operand; and
storing a mapping of the shared register to a physical register ID in the renaming table upon determining that the new shared register can be acquired.

6. The apparatus of claim 5, wherein the register renaming further comprises stalling the context upon determining that the new shared register is not acquired.

7. The apparatus of claim 1, wherein renaming includes assigning first variables having long live ranges to the set of fixed registers, and assigning second variables having short live ranges to the set of shared registers.

8. The apparatus of claim 7, wherein the register renaming logic facilitates the generation of spill code upon a determination that register assignments exceed the plurality of registers on the register file.

9. The apparatus of claim 1, wherein the register renaming logic provides instructions as to when a register in the set of shared registers is to be released, wherein a location of a local variable is marked to be released after a final last use before a new full definition, wherein a location of a global variable is marked to be released at an immediate post-dominator in a control flow graph for basic blocks that include last uses of a previous definition.

10. A graphics processor comprising:
a plurality of execution units to process graphics context data;
a register file having a plurality of registers to store the graphics context data;
decoding logic to perform register renaming of operands from a set of fixed registers and
operands from a set of shared registers during execution of a context, wherein a size of the set of shared registers is adjustable and larger than the set of fixed registers; and
a renaming table to store the renaming of each register within the set of shared registers to a shared physical register, wherein renaming includes dynamically renaming a variable assigned to a shared register to a unified physical register file that is shared by hardware contexts associated with an execution unit, wherein the variable is assigned during kernel execution.

11. The graphics processor of claim 10, wherein the register renaming comprises:
determining whether a register identification (ID) of an operand of the context is less than a starting range of the set of shared registers; and
accessing the set of fixed registers to perform an operation on the operand upon determining that the operand is less than the starting range of the set of shared registers.

12. The graphics processor of claim 11, wherein the register renaming further comprises:
determining whether the operand is a source operand upon determining that the operand is greater than the starting range of the set of shared registers;
accessing the renaming table to find a physical register corresponding to the register ID upon determining that the operand is a source operand; and
fetching the operand from the set of shared registers.

13. The graphics processor of claim 12, wherein the register renaming further comprises:
determining whether a new shared register can be acquired upon determining that the operand is not a source operand; and
storing a mapping of the shared register to a physical register ID in the renaming table upon determining that the new shared register can be acquired.

14. The graphics processor of claim 13, wherein the register renaming further comprises stalling the context upon determining that the new shared register is not acquired.

15. The graphics processor of claim 10, wherein the register renaming logic is further to facilitate dynamic renaming of the plurality of registers by logically partitioning the plurality of registers in the register file into a set of fixed registers and a set of shared registers, wherein the set of shared registers contains more than 64 registers.

16. A method comprising:
receiving graphics context operands at a graphics processor;
decoding the operands; and
performing register renaming of the operands from a set of fixed registers and operands from a set of shared registers during execution of the graphics contexts, wherein a size of the set of shared registers is adjustable and larger than the set of fixed registers, wherein renaming includes dynamically renaming a variable assigned to a shared register to a unified physical register file that is shared by hardware contexts associated with an execution unit, wherein the variable is assigned during kernel execution.

17. The method of claim 16, wherein the register renaming comprises: determining whether a register identification (ID) of an operand of the context is less than a starting range of the set of shared registers; and
accessing the set of fixed registers to perform an operation on the operand upon determining that the operand is less than the starting range of the set of shared registers.

18. The method of claim 17, wherein the register renaming further comprises:
determining whether the operand is a source operand upon determining that the operand is greater than the starting range of the set of shared registers, wherein the set of shared registers contains more than 64 registers;
accessing the renaming table to find a physical register corresponding to the register ID upon determining that the operand is a source operand; and
fetching the operand from the set of shared registers.

19. The method of claim 18, wherein the register renaming further comprises:
- determining whether a new shared register can be acquired upon determining that the operand is not a source operand; and
- storing a mapping of the shared register to a physical register ID in the renaming table upon determining that the new shared register can be acquired.

20. The method of claim 19, wherein the register renaming further comprises stalling the context upon determining that the new shared register is not acquired.

21. A non-transitory machine-readable medium having stored thereon instructions that when executed by a computing device, cause the computing device to perform operations comprising:
- receiving graphics context operands at a graphics processor;
- decoding the operands; and
- performing register renaming of the operands from a set of fixed registers and operands from a set of shared registers during execution of the graphics contexts, wherein a size of the set of shared registers is adjustable and larger than the set of fixed registers, wherein renaming includes dynamically renaming a variable assigned to a shared register to a unified physical register file that is shared by hardware contexts associated with an execution unit, wherein the variable is assigned during kernel execution.

22. The non-transitory machine-readable medium of claim 21, wherein the register renaming comprises:
- determining whether a register identification (ID) of an operand of the context is less than a starting range of the set of shared registers; and
- accessing the set of fixed registers to perform an operation on the operand upon determining that the operand is less than the starting range of the set of shared registers.

23. The non-transitory machine-readable medium of claim 22, wherein the register renaming further comprises:
- determining whether the operand is a source operand upon determining that the operand is greater than the starting range of the set of shared registers, wherein the set of shared registers contains more than 64 registers;
- accessing the renaming table to find a physical register corresponding to the register ID upon determining that the operand is a source operand; and
- fetching the operand from the set of shared registers.

* * * * *